June 15, 1948.  G. BRERETON  2,443,296
RAMIE HARVESTING AND DECORTICATING MACHINE
Filed Feb. 9, 1944
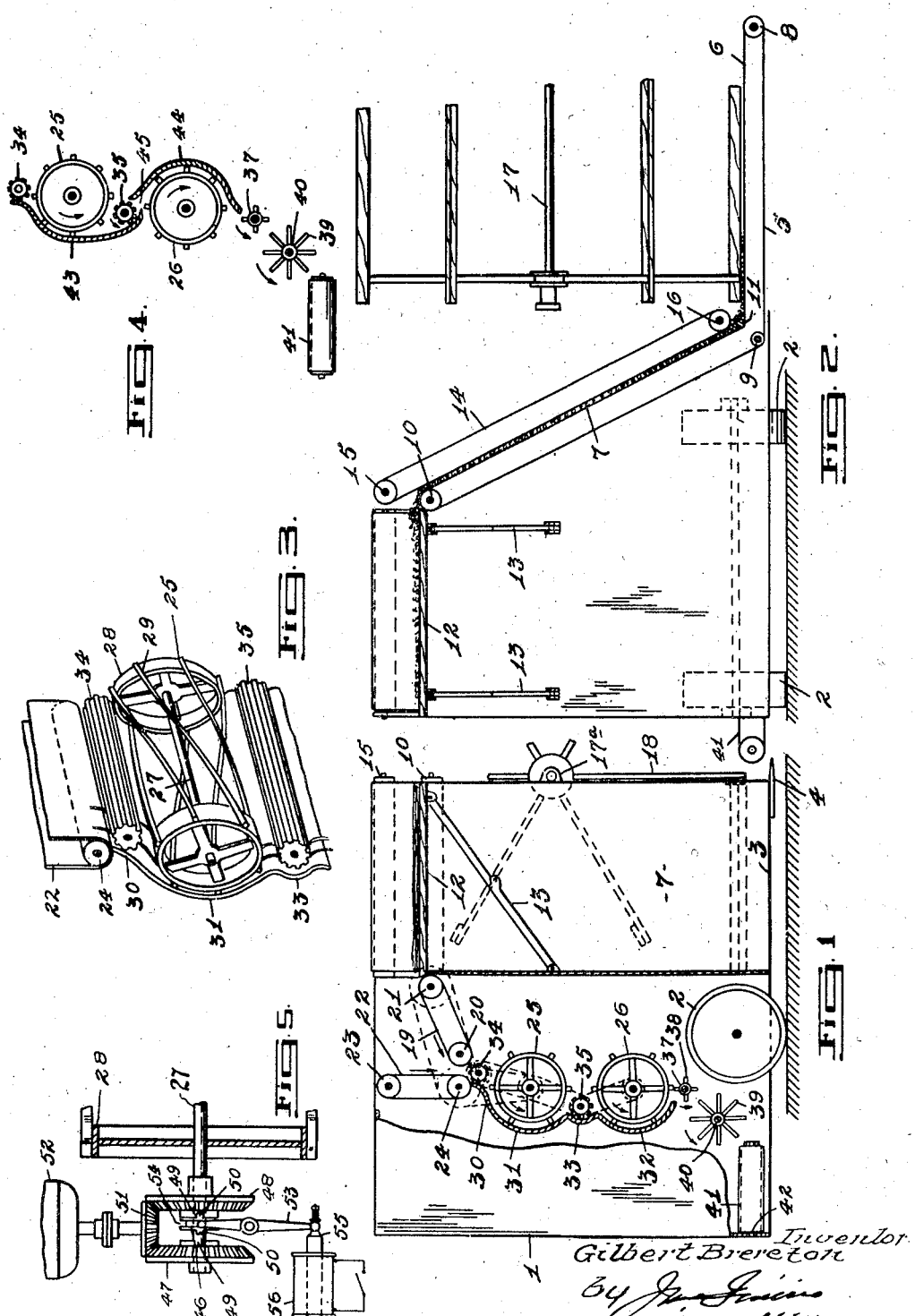
Inventor
Gilbert Brereton Patented June 15, 1948

2,443,296

UNITED STATES PATENT OFFICE 2,443,296

RAMIE HARVESTING AND DECORTICATING MACHINE

Gilbert Brereton, Toronto, Ontario, Canada, assignor to Elmar Corporation, New York, N. Y., a corporation of Delaware Application February 9, 1944, Serial No. 521,704

6 Claims. (Cl. 19—30)

1

The invention relates to improvements in ramie harvesting and decorticating machines as described in the present specification and shown in the accompanying drawings that form a part of the same.

While it has long been recognized that the fibres of the ramie bark are capable of producing a stronger, tougher and more durable thread than any yet known, which make them invaluable in the manufacture of cloth, draperies, dress goods, linens, automobile tires and other fabrics, the full scope of the use of the plant has not been possible owing to the fact that no efficient mechanical means has heretofore been devised for separating the tough bark from the interior gummy core.

The object of the present invention is to provide a machine which will cut the plant, remove the bark and separate the fibres from the interior gummy core in successive operations and deliver the fibres in condition for being spun into threads.

The invention consists in the novel features of construction arrangements and combinations of parts described in the present specification and more particularly pointed out in the claims for novelty following.

In describing the invention reference will be made to the accompanying drawings, in which:

Figure 1 is an end view of the machine with a portion of the outer wall of the decorticating chamber broken away and parts of the interior mechanism shown in section.

Figure 2 is a front view of the machine with portions of the frame and other parts broken away.

Figure 3 is a diagrammatic view showing one of the scrapers and the associated parts.

Figure 4 is a diagrammatic view of a modified arrangement of the decorticating mechanism.

Figure 5 is a diagrammatic view partly in section showing the means for reversing the direction of travel of one of the scraper elements.

Like numerals of reference indicate corresponding parts in the various figures.

Referring to the drawings 1 is a box-like structure in which is located the mechanism employed to separate the bark from the core, the said structure being hereinafter referred to as the decorticating chamber, and being provided with running gear 2, and with suitable connections (not shown in the drawings) whereby it may be attached to a tractor or other means to be used to draw it over the ground.

An extension 3 projecting forwardly from one

2 end of the chamber 1 provides means for supporting a cutter rack which extends laterally in respect to said chamber and carries a series of knives 4 by means of which the stalks are cut.

5 is an endless conveyor comprising a horizontal portion 6 positioned above and to the rear of the knives and operating in a direction towards the chamber, and an upwardly inclined portion 7 extending upwardly to a point at, or near, the top of the chamber 1, said conveyor operating around suitable pulleys 8, 9 and 10 and beneath an idler 11 positioned at the inner end of the horizontal platform 6. The movable horizontal portion and its inclined extension is for the purpose of receiving the stalks after being cut by the knives 4 and delivering them onto a table 12 supported near the top of the chamber 1.

The table 12 is preferably supported by means of collapsible brackets 13 secured to the outer wall of the chamber 1.

An endless conveyor 14 positioned forwardly of the inclined portion 7 of the conveyor 5 in parallel therewith and spaced slightly therefrom to admit of the stalks entering the space between the two conveyors, provides means for conveying the said stalks upwardly to the table 12. The conveyor 14 operates around pulleys 15 and 16 and said conveyor is driven in any suitable manner.

A reel 17 journalled in bearings 17a supported by brackets 18 carried by the frame of the machine and driven in any desired manner provides means for depositing the stalks onto the horizontal portion 6 of the conveyor 5 as they are cut by the knives 4.

19 is a downwardly inclined endless conveyor positioned within the chamber 1, of a width equalling the length of the table 12, and the top end of said conveyor being substantially on the same level as said table whereby the stalks loaded on to said table may be fed by hand on to said conveyor and will be lowered by said conveyor into the interior of said chamber near the transverse centre of the interior of the latter.

The conveyor 19 operates around pulleys 20 and 21, one of which is driven, and said conveyor may comprise a smooth belt or may be corrugated or may be composed of suitably connected slats, to more effectually carry the stalks.

22 is an endless conveyor operating in a vertical direction around pulleys 23 and 24, the one pulley 23 being positioned near the top of the chamber 1 and the lower pulley being positioned on substantially the same level as the pulley 20 of the conveyor 19 and spaced therefrom a distance to permit of the stalks passing between the lower ends of the two said conveyors.

The conveyors 19 and 22 are driven in opposite directions whereby they will converge on the stalks and force them downwardly between the lower ends of the conveyors into the portion of the chamber therebelow.

Suitable means may, if desired, be provided for adjusting the lower end of one or the other conveyor to vary the distance between the lower ends of the conveyors, said means not being shown in the drawings as this is common practice in the mechanical art.

25 and 26 are rotary scrapers positioned one above the other in spaced relation to one another below the opening between the lower ends of the conveyors 19 and 22, with the topmost scraper spaced from said lower ends of said conveyors. The scrapers may be driven in any desired manner but it is essential that the lower scraper be driven at a much greater speed than the topmost scraper.

The scrapers 25 and 26 are identical in construction and each comprises a driven axle 27 supported at its opposite ends in bearings in suitable brackets or in the opposing walls of the decorticating chamber, wheels 28 fixed to the said axle near the opposite ends of the latter, and a number of helical scraper elements 29 extending between and secured at their ends to the wheels 28 in spaced relation to one another circumferentially of the said wheels. The scraper elements or blades 29 preferably have their edges dulled in order that the bark may not be cut in the decorticating operation and also to insure that the stalks will be effectually crushed.

30 is a crusher member consisting of a rigid plate extending from a point just below the lower end of the vertical conveyor 22 to a point below the lower scraper 26, the said plate being curved as at 31 and 32 to extend around the corresponding sides of the scrapers 25 and 26 respectively, and also having a curved intermediate portion 33 positioned between the said scrapers. The purpose of the crusher plate 30 is to provide a rigid backing against which the stalks are crushed by the rotary scrapers so that the said scrapers can effectually perform their function of scraping the bark from the cores.

The arrangement of the curved portions 31 and 32 of the crusher plate 30 and the relationship of the scrapers 25 and 26 to crusher plate is such that the curved surfaces of the curved portions 31 and 32 of the crusher plate are tangent to a single plane that is substantially parallel to a plane containing the axes of rotation of scrapers 25 and 26. An important advantage of the helical or spiral scraper blades 29 is that they cooperate with the crusher plate 31 to cause the ramie stalks passing between the scrapers and crusher plate to be axially rotated with respect to the crusher plate to thereby present new surfaces of the stalks for scraping. The layer of ramie stalks passing between the crusher plate and scrapers is scraped from one side only, but individual stalks of the layer are rotated by the helical blades 29 to permit complete scraping of the periphery of the stalks. This "one-sided" scraper and crusher plate construction tends to prevent bunching of the fibers between the scrapers and consequent clogging of the machine.

34 and 35 are holding and crushing elements comprising longitudinally corrugated rolls extending parallel with the scrapers 25 and 26, one being positioned above the scraper 25 in the mouth formed by the converging ends of the conveyors 19 and 22 and the other being located between the said scrapers in the recess formed by the curve 33 in the plate 30.

The rolls 34 and 35 are suitably journalled at their opposite ends in the machine frame and are adapted to be rotated by means of a series of belts connecting said rolls and the respective scrapers. The purpose of the rolls is to exert a holding influence on the stalks to facilitate the scraping operation and at the same time, owing to their proximity to the crusher plate, to thoroughly crush and scrape the ends of the stalks.

37 is a heater positioned below the lowermost scraper 26 and spaced slightly from the end of the crusher plate 30, the said beater consisting of a shaft extending parallel with the scraper 26, journalled at its ends in suitable bearings and driven in any desired manner at a very high rate of speed, and being provided with radial blades 38 adapted on the rotation of the beater to thoroughly beat the material passing the lower end of the crusher plate 30. As a result of the action of the beater the heavy core particles are dislodged from the stalks and drop downwardly while the stalks are impelled outwardly on to the blades 39 of a loader wheel positioned beneath and to one side of said beater.

The loader wheel includes a central shaft 40 from which the blades 39 radiate and this shaft is journalled at its ends in any desired manner and further is connected in any suitable way to the sources of driving power whereby it is rotated at a low rate of speed in comparison to the beater.

An endless conveyor 41 suitably positioned in relation to the loader wheel to catch the stalks as they fall from the blades of said wheel extends outwardly through an opening 42 in the wall of the chamber 1 whereby the said stalks from which the cores have been removed, are deposited on the ground.

In the operation of this invention the machine is drawn over the ground and the stalks cut by the knives 4, upon which the reel 17 operates to deposit the stalks across the horizontal portion 6 of the conveyor 5. The conveyors 5 and 14 operate to move the stalks up the inclined portion 7 and deposit them on the table 12, from which they are fed on to the inclined conveyor 19 with the stalks lying lengthwise of said conveyor owing to the relative positions of the conveyor 19 and the table. The conveyor 19 together with the vertical conveyor 22 impels the stalks downwardly through the opening between the lower ends of said conveyors and over the side of the roll 34 next to the crusher plate 30. The roll 34 crushes the stalks against the plate 30 and passes them on to the side of the rotating scraper 25 next to the curved portion 31 of said plate where they are thoroughly scraped by the blades of said scraper and forced downwardly over the corresponding side of the roll 35. This roll 35 crushes the stalks against the curved portion 33 of the plate 30 and passes them on to the corresponding side of the scraper 26 which is rotating at a much higher rate of speed than that of the first scraper and by means of which the stalks are again scraped. While the stalks are being crushed and scraped by the fast rotating scrapers the rolls exert a holding influence on them against the downward pull of the scrapers on the stalks and thus insure the stalks being thoroughly scraped. The helical formation of the scraper blades tends to spread the stalks and thus prevent bunching. As the stalks pass beyond the lowermost scraper they are thoroughly beaten by the beater 37, with the result that the loose core particles drop to the bottom of the chamber or on to the ground, while the stalks themselves are thrown outwardly on to the blades of the loader wheel 40 which in turn deposits them on the conveyor 41, by means of which latter they are emitted from the machine and deposited on the ground in a cleaned condition.

In Figure 4 a modified construction is shown in which the crusher plate comprises two separate sections, 43 and 44 respectively, the one section 43 extending around the one side of the scraper 25 and the rolls 34 and 35 and the other section 44 extending around the other side of the scraper 26, with the adjacent ends spaced apart to provide an opening 45 through which the stalks are adapted to pass from the side of one scraper to the other side of the other scraper. By using this construction both sides of the stalks will be thoroughly scraped and crushed.

In Figure 5 means is shown for reversing the direction of travel of the topmost scraper 25 after the stalks have been advanced along the plate 30 sufficiently far that the lower ends thereof are gripped between the roller 35 and said plate so that said stalks can be scraped in an upward direction after they have been scraped downwardly while the top ends thereof were being held by the top roller 34 against the plate 30.

This reversing means comprises a collar 46 keyed to the scraper shaft 27 for sliding movement therealong and operating between opposed bevel gears 47 and 48 loosely encircling said shaft, whereby said collar may be brought into operative engagement with either gear in accordance with the direction the shaft 27 is to be driven. The gears 47 and 48 are provided with opposed slots 49 and the collar 46 is provided with oppositely extending lugs 50 adapted on the movement of the collar along the shaft to be moved into one or the other of said slots, according to the direction in which said collar is moved, whereby to operatively connect the collar with the particular gear required to be rotated.

A bevel gear 51 suitably connected with a motor 52, or other source of power, provides means for rotating the gears 47 and 48.

An arm 53 pivoted intermediate of its length and at one end entering a recess 54 in the collar 46 and at its other end connected to the plunger 55 of a solenoid 56 provides means for moving the said collar in the required direction on the energising of said solenoid. Suitable means may be provided for making and breaking the electric circuit to said solenoid.

When the lower ends of the stalks have passed the upper roller 34 and while the remaining portions are still being held against the plate 30 by said roller the scraper 25 is rotated in a direction to scrape the stalks in a downward direction and when the top ends of said stalks have passed downwardly beyond said roll and the lower ends thereof have come under the influence of the lower roller 35 the direction of travel of the said scraper 25 is reversed, by operation of the means for controlling the circuit to the solenoid, to cause the said scraper to be operated in an upward direction and thus scrape the stalks in the opposite direction.

While I have illustrated and described the present preferred forms of construction for carrying out my invention, these are capable of variation and modification without departing from the spirit of the invention, I, therefore, do not wish to be limited to the precise details of construction set forth, but desire to avail myself of such variations and modifications as come within the scope of the appended claims.

What I claim is:

1. In a ramie harvesting and decorticating machine, a rigid member along which the stalks are adapted to be passed lengthwise, a plurality of spaced rotatable scrapers adapted to act successively on said stalks to crush same against said rigid member and scrape the bark, a plurality of rollers alternating with said scrapers in advance relation to the respective scrapers for holding said stalks against said rigid member as they are being crushed and scraped by said scrapers, means for driving said scrapers and said rollers, means for reversing the direction of travel of the topmost of said scrapers during the period the stalks are being held by the roller immediately therebelow, and a beater positioned below the lowermost scraper.

2. A ramie harvesting and decorticating machine according to claim 1, in which said means for reversing the direction of travel of said topmost scraper comprises a collar keyed to said topmost scraper shaft for sliding movement therealong, an electrically operated intermediately pivoted arm having its one end loosely entering a groove in said collar whereby said collar will be moved along said shaft in one or the other direction according to the operation of said arm, bevel gears loosely encircling said shaft at opposite sides respectively of said collar, means for operatively connecting said collar and the respective bevel gears, and a driven gear meshing with the aforesaid gears.

3. In a ramie harvesting and decorticating machine, in combination, a series of rotary scrapers, crusher plate means adapted to coact with said scrapers to cause said scrapers to scrape stalks of ramie passing between said crusher plate means and said scrapers, said crusher plate means having a plurality of curved surfaces confronting said scrapers and curved to conform with the curvature of the peripheries of said scrapers, all of the curved surfaces of said crusher plate means being located on one side of a plane in which the axes of rotation of said scrapers are located, each of said scrapers being provided at its periphery with a plurality of scraper blades that are spirally arranged to cooperate with said crusher plate means to rotate said stalks with respect to said crusher plate means as said scrapers rotate to thereby present new surfaces of said stalks for scraping, feeding means for feeding ramie stalks lengthwise between said crusher plate means and the first scraper of said series and driving means for rotating said scrapers with respect to said crusher plate means to cause said scrapers and said crusher plate means to cooperate to scrape said stalks and to cause said ramie stalks to be advanced from one end of said series to the other end thereof.

4. In a ramie harvesting and decorticating machine, in combination, a single unitary crusher plate along which stalks of ramie are adapted to be passed, a series of rotary scrapers confronting said crusher plate and adapted to coact therewith to scrape said stalks, successive portions of said unitary crusher plate being curved to conform with the curvature of the peripheries of successive scrapers of said series, said curved portions of said unitary crusher plate being so arranged with respect to said scrapers that all of the scrapers of said series confront the same side of said crusher plate, each of said scrapers being provided at its periphery with a plurality of scraper blades that are spirally arranged to cooperate with said crusher plate to rotate said stalks to thereby present new surfaces of said stalks lengthwise for scraping, feeding mechanism for feeding ramie stalks between said crusher plate and the first scraper of said series and driving means for rotating said scrapers with respect to said crusher plate to cause said scrapers and said crusher plate to cooperate to scrape said stalks and to cause said stalks to be advanced from one end of said series to the other end thereof.

5. In a ramie harvesting and decorticating machine, in combination, a series of rotary scrapers, a crusher plate structure adapted to coact with said scrapers to cause said scrapers to scrape stalks of ramie passing between said crusher plate structure and said scrapers, said crusher plate structure having a plurality of curved surfaces confronting said scrapers and curved to conform with the curvature of the peripheries of said scrapers, all of the curved surfaces of said crusher plate structure being located on one side of a plane in which the axes of rotation of said scrapers are located, each of said scrapers being provided at its periphery with a plurality of scraper blades that are spirally arranged to cooperate with said crusher plate structure to rotate said stalks with respect to said crusher plate structure as said scrapers rotate to thereby present new surfaces of said stalks for scraping, rotary feeding mechanism for feeding ramie stalks lengthwise between said crusher plate structure and the first scraper of said series and driving mechanism for rotating said scrapers with respect to said crusher plate structure to cause said scrapers and said crusher plate structure to cooperate to scrape said stalks and to cause said ramie stalks to be advanced from one end of said series to the other end thereof.

6. In a ramie harvesting and decorticating machine, in combination, a series of rotary scrapers, a crusher plate structure adapted to coact with said scrapers to cause said scrapers to scrape stalks of ramie passing between said crusher plate structure and said scrapers, said crusher plate structure having a plurality of curved surfaces confronting said scrapers and curved to conform with the curvature of the peripheries of said scrapers, all of the curved surfaces of said crusher plate structure being located on one side of a plane in which the axes of rotation of said scrapers are located, each of said scrapers comprising a pair of spaced wheels mounted on a rotatable shaft and a plurality of spirally arranged blades extending from the periphery of one of said wheels to the periphery of the other wheel, said blades being adapted to cooperate with said crusher plate structure to rotate said stalks with respect to said crusher plate structure as said scrapers rotate to thereby present new surfaces of said stalks for scraping, rotary feeding mechanism for feeding ramie stalks lengthwise between said crusher plate structure and the first scraper of said series, and driving mechanism for rotating said scrapers with respect to said crusher plate structure to cause said scrapers and said crusher plate structure to cooperate to scrape said stalks and to cause said ramie stalks to be advanced from one end of said series to the other end thereof.

GILBERT BRERETON.

REFERENCES CITED

The following references are of record in the file of this patent:

UNITED STATES PATENTS

| Number | Name | Date |
|---|---|---|
| 21,264 | Little | Aug. 24, 1858 |
| 266,124 | Favier | Oct. 17, 1882 |
| 409,847 | Leruth | Aug. 27, 1889 |
| 899,070 | Pons | Sept. 22, 1908 |
| 1,308,267 | Stewart | July 1, 1919 |
| 1,403,830 | Barbieri | Jan. 17, 1922 |
| 1,427,201 | Freuler et al. | Aug. 29, 1922 |
| 1,906,850 | Gminder | May 2, 1933 |
| 1,937,794 | Selvig | Dec. 5, 1933 |
| 2,137,093 | Monforts et al. | Nov. 15, 1938 |
| 2,208,287 | Cochrane | July 16, 1940 |
| 2,263,591 | Patterson | Nov. 25, 1941 |

FOREIGN PATENTS

| Number | Country | Date |
|---|---|---|
| 5,455 | Great Britain | 1908 |

Certificate of Correction

Patent No. 2,443,296. June 15, 1948.

GILBERT BRERETON

It is hereby certified that errors appear in the printed specification of the above numbered patent requiring correction as follows: Column 4, line 14, for the word "heater" read *beater*; line 33, for "sources" read *source*; column 7, line 4, strike out "lengthwise" and insert the same after "stalks", line 6; and that the said Letters Patent should be read with these corrections therein that the same may conform to the record of the case in the Patent Office.

Signed and sealed this 28th day of September, A. D. 1948.

[SEAL]

THOMAS F. MURPHY,
*Assistant Commissioner of Patents.*